United States Patent [19]
Tanaka

[11] Patent Number: 6,028,732
[45] Date of Patent: *Feb. 22, 2000

[54] TRACKING CONTROL DEVICE WITH ERROR SIGNAL SELECTION FROM PLURAL ERROR SIGNALS

[75] Inventor: Shuya Tanaka, Kanagawa-ken, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/512,841

[22] Filed: Aug. 9, 1995

[30] Foreign Application Priority Data

Aug. 23, 1994 [JP] Japan .................................. 6-198121

[51] Int. Cl.⁷ .................................................. G11B 5/584

[52] U.S. Cl. ............................................................ 360/77.13

[58] Field of Search .............................. 360/77.13, 77.12, 360/77.14, 70

[56] References Cited

U.S. PATENT DOCUMENTS

| | | | |
|---|---|---|---|
| 4,104,684 | 8/1978 | Wakami | 360/70 |
| 4,277,807 | 7/1981 | Baldwin | 360/32 |

*Primary Examiner*—Alan Faber
*Attorney, Agent, or Firm*—Robin, Blecker & Daley

[57] ABSTRACT

A tracking control device and method reduce the rate of occurrence of data error and improve the quality of reproduced images in a digital VTR. The tracking control device comprises a reproducing head for reproducing digital information from a recording medium, a forming circuit for forming a plurality of tracking error signals which respectively indicate positional deviations of the reproducing head from a plurality of areas into which each track formed on the recording medium is divided, a selecting circuit for selecting one tracking error signal from among the plurality of tracking error signals in accordance with their respective values, and a tracking control circuit for controlling a relative position between the reproducing head and the recording medium on the basis of the one tracking error signal selected by the selecting circuit.

9 Claims, 6 Drawing Sheets

TRACKING CONTROL DEVICE WITH ERROR SIGNAL SELECTION FROM PLURAL ERROR SIGNALS

BACKGROUND OF THE INVENTION

1. Field of the Invention

The present invention relates to a tracking control device and, more particularly, to a device capable of controlling the relative position between a reproducing head and a recording medium during the reproduction of a digital information signal from a track formed on the recording medium.

2. Description of the Related Art

Reproduction tracking systems for domestic-use video tape recorders or video cassette recorders fall into two major systems. The first system is called "CTL system". In the CTL system, a fixed magnetic head is provided at a particular location in a tape path. During recording, a control signal (CTL signal) is recorded on a dedicated track, and, during reproduction, a reproducing head is made to trace a track by using the CTL signal reproduced from the dedicated track. The second system is called "ATF system". In the ATF system, during recording, a plurality of (normally, four) kinds of pilot signals having comparatively low frequencies are recorded simultaneously with a main signal (normally, a video signal) in multiplexed form in such a manner that the frequencies are recurrently repeated from track to track. During reproduction, a tracking error signal (ATF error signal) is obtained by making a comparison between the frequency of the pilot signal reproduced from a track simultaneously with the main signal and the pilot signals reproduced from both adjacent tracks by crosstalk, and a reproducing head is made to trace the track on the basis of the tracking error signal.

In recent years, higher image quality and digitization have been increasingly demanded even in the field of domestic-use video tape recorders, and research and development have been conducted as to formats of narrower track pitch so that more information can be recorded and reproduced. In the case of reproduction from a narrow-pitch track, it is extremely important to increase the accuracy of the longitudinal linearity of the track. For example, in the case of a track of 10-$\mu$m pitch, the linearity must be held at 3 $\mu$m or less. This value is close to the limit of mechanical precision and offers great problems in terms of productivity and cost.

In general, the relationship between reproduction RF level and error rate of reproduced data in the case of a digital VTR is represented by the characteristic shown in FIG. 1. In general, in digital recording, if the reproduction RF level is not less than a particular level, the quality of reproduced signals is not substantially influenced. For example, as shown in FIG. 1, if the reproduction RF level is not less than a proper threshold (for example, 50%), the error rate of the reproduced data will show a low value which is a generally tolerable error rate (for example, a threshold Eth of approximately $10^{-4}$). If the reproduction RF level becomes less than the threshold Eth, the error rate increases sharply. In the case of the characteristic shown in FIG. 1, the reproduction RF level may be not less than 50%.

There is also a known art (DTF system) provided with an actuator for displacing a rotary head in a direction which intersects the rotating direction thereof. According to this art, even if a track is curved to some extent, the rotary head can be made to trace the curvature. Although the art is effective in improving tracking performance, it is necessary to use an extremely expensive rotary drum having a very complicated structure. In particular, it is extremely difficult to incorporate such an actuator into a small-diameter rotary drum, and complicated and awkward position control of the rotary head is needed.

Tracking control signals, such as the tracking error signal used in the ATF system, are normally formed by quantifying the amount of deviation of tracking. As a result, if tracking is controlled (i.e., the rotation of a capstan is controlled) by using only such a tracking control signal, the tracking control will result in average-value control which may not necessarily be effective in reducing the error rate of reproduced data in the digital VTR. In such a case, the image quality of reproduced images is not improved.

SUMMARY OF THE INVENTION

It is, therefore, an object of the present invention to provide a tracking control device capable of improving the data error rate of a reproduced digital signal over the whole of each track.

To achieve the above object, in accordance with one aspect of the present invention, there is provided a tracking control device which comprises reproducing means for reproducing digital information from a recording medium, forming means for forming a plurality of tracking error signals which respectively indicate positional deviations of the reproducing means from a plurality of areas into which each of a plurality of tracks formed on the recording medium is divided, selecting means for selecting one tracking error signal from among the plurality of tracking error signals in accordance with respective values of the plurality of tracking error signals, and tracking control means for controlling a relative position between the reproducing means and the recording medium on the basis of the one tracking error signal selected by the selecting means.

In accordance with another aspect of the present invention, there is provided a tracking control device which comprises reproducing means for reproducing digital information from a recording medium, forming means for forming a plurality of tracking error signals which respectively indicate positional deviations of the reproducing means from a plurality of areas into which each of a plurality of tracks formed on the recording medium is divided, selecting means for selecting one tracking error signal from among the plurality of tracking error signals in accordance with a data error rate measured per track, of the digital information reproduced by the reproducing means, and tracking control means for controlling a relative position between the reproducing means and the recording medium on the basis of the one tracking error signal selected by the selecting means.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Preferred embodiments of the present invention will be described below in detail with reference to the accompanying drawings.

Figure 1:
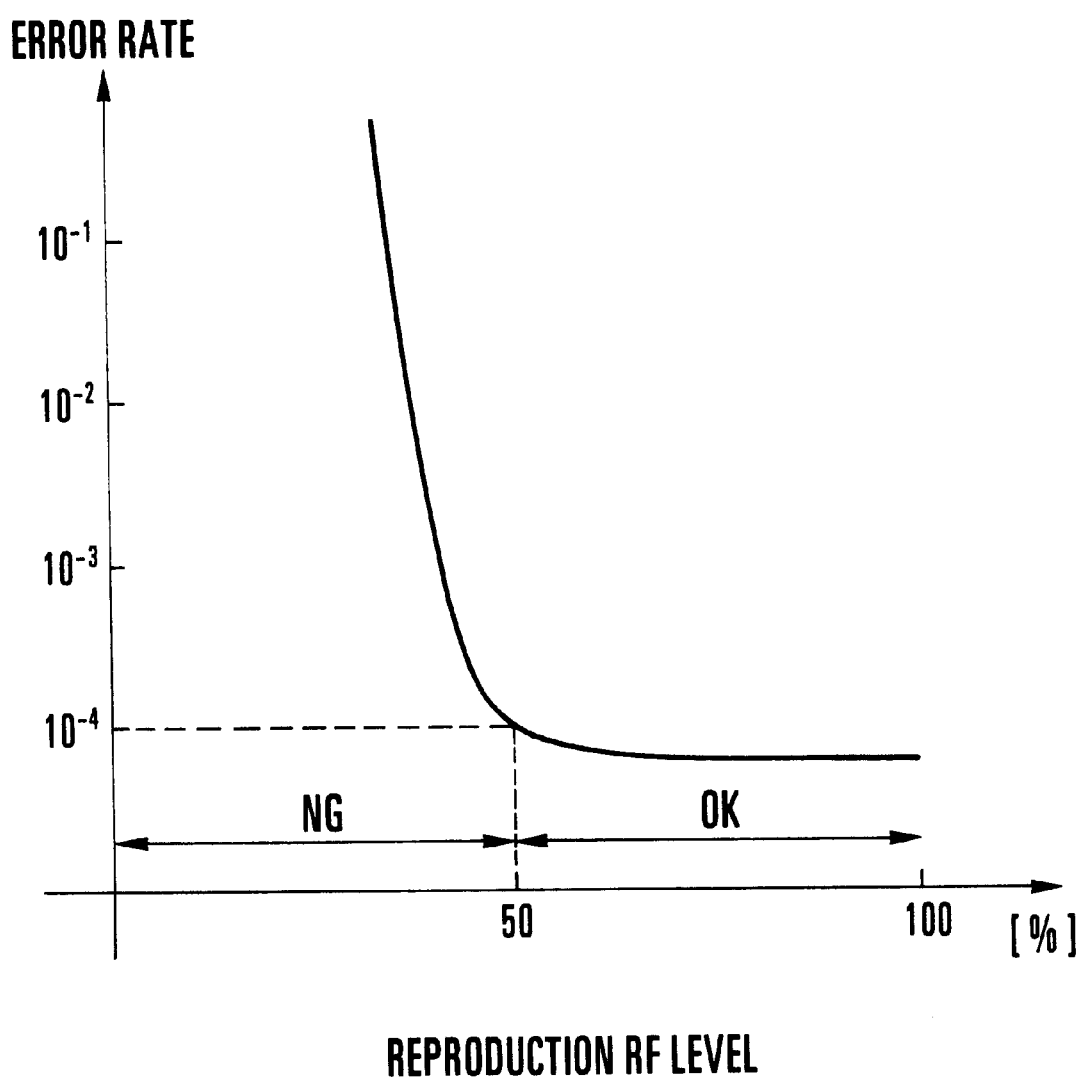
FIG. 1 is a graphic representation showing the relationship between reproduction RF level and error rate in a digital VTR.
Figure 2:
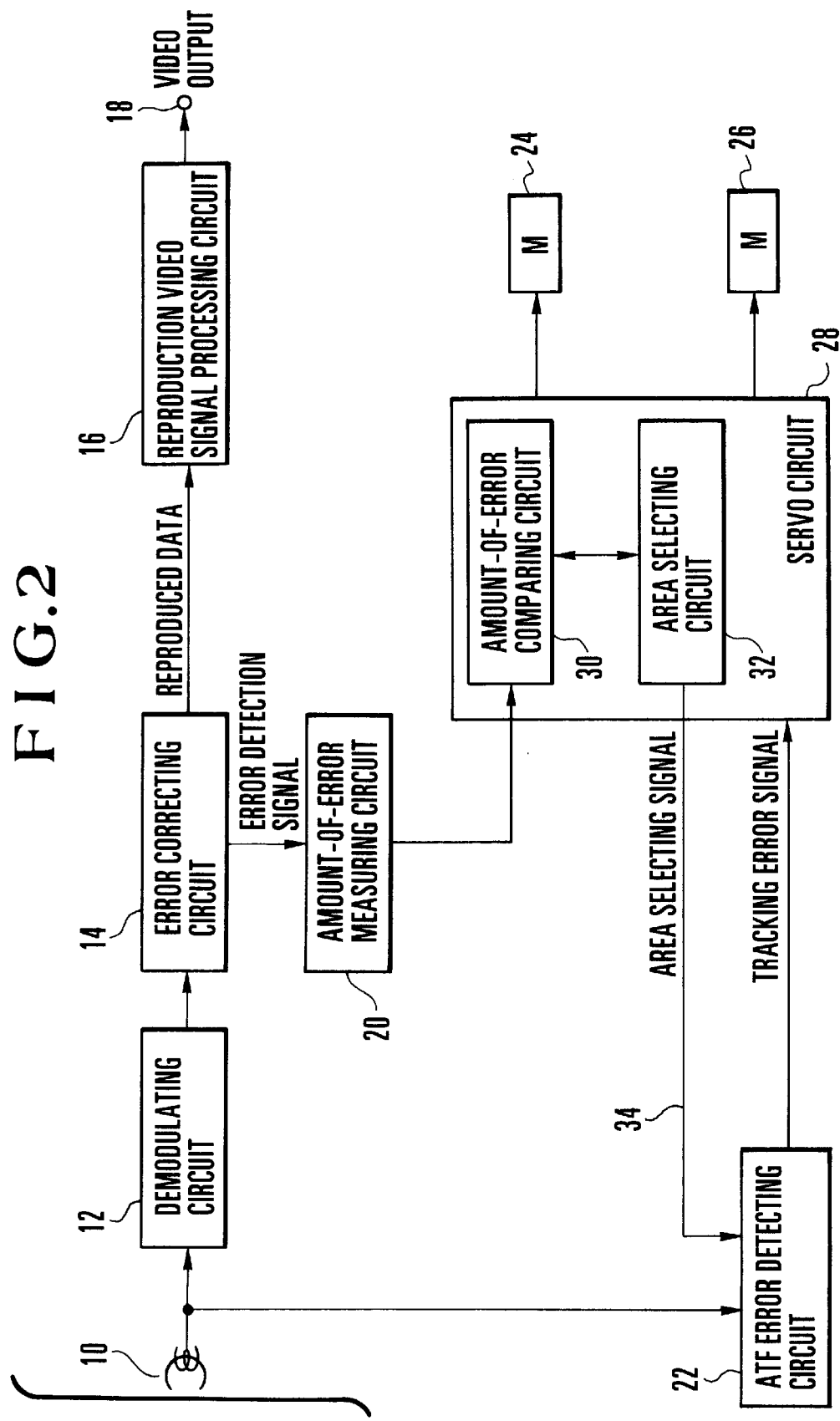
FIG. 2 is a schematic block diagram showing the arrangement of the essential elements of a digital VTR according to a first embodiment of the present invention.

FIG. 2 is a schematic block diagram showing a first embodiment of the present invention which is applied to a video tape recorder (VTR). The shown video tape recorder includes a reproducing head 10 for tracing a magnetic tape which is a recording medium and outputting a reproduced RF signal, a digital demodulating circuit 12 for digitally demodulating the reproduced RF signal outputted from the reproducing head 10, an error correcting circuit 14 for detecting and correcting errors in the digital data demodulated by the digital demodulating circuit 12, a reproduction video signal processing circuit 16 for converting the digital data corrected by the error correcting circuit 14 into a video signal, and an output terminal 18 through which to output the reproduced video signal provided by the reproduction video signal processing circuit 16.

The shown video tape recorder also includes an amount-of-error measuring circuit 20 for measuring the amount of error from an error detection signal outputted from the error correcting circuit 14, and an ATF error detecting circuit 22 for extracting a pilot signal component from the reproduced RF signal outputted from the reproducing head 10 and outputting a tracking error signal indicative of the amount of tracking deviation.

The shown video tape recorder also includes a drum motor 24, a capstan motor 26, and a servo circuit (microcomputer) 28 for controlling the rotation of the drum motor 24 and that of the capstan motor 26. The servo circuit 28 used in the first embodiment is provided with an amount-of-error comparing circuit 30 and an area selecting circuit 32 both of which are associated with tracking control. The amount-of-error comparing circuit 30 serves to make a comparison between the amounts of error measured by the amount-of-error measuring circuit 20, and the area selecting circuit 32 serves to specify an area for detection of the amount of tracking deviation (off-track amount) by the ATF error detecting circuit 22. Needless to say, in practice, the amount-of-error comparing circuit 30 and the area selecting circuit 32 are realized by software.

Figure 3:
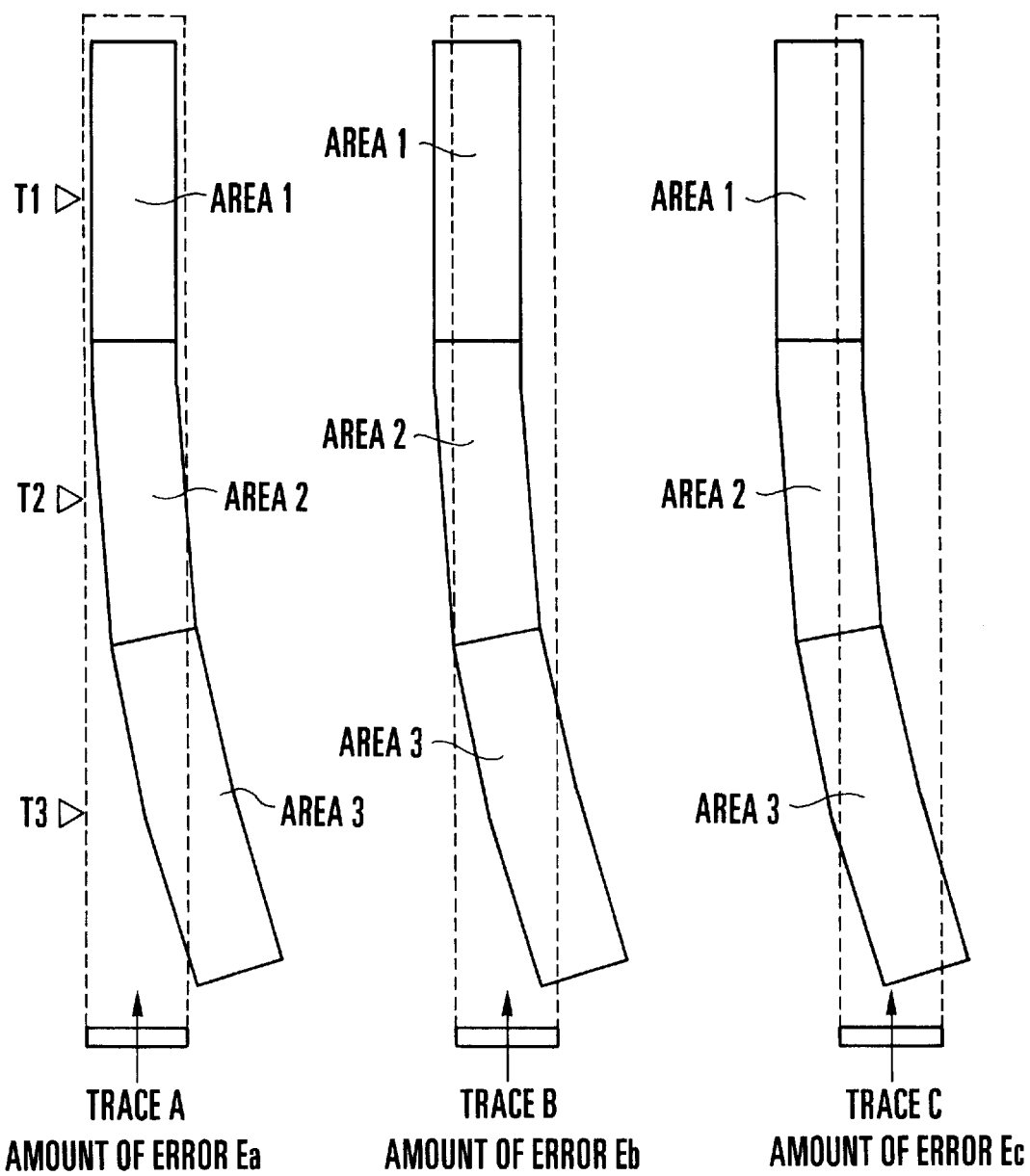
FIGS. 3(A), 3(B) and 3(C) are views aiding in describing the operation of the device shown in FIG. 2, and show different trace loci of a reproducing head with respect to a track.

FIGS. 3(A), 3(B) and 3(C) show a case where the reproducing head 10 traces a track curved at its start end portion where the reproducing head 10 starts tracing, and show the trace loci of three different traces A, B and C each having the same inclination and a different tracking phase with respect to the track.

The operation of the device shown in FIG. 2 will be described below with reference to FIGS. 3(A), 3(B) and 3(C) by way of example. As shown in FIGS. 3(A), 3(B) and 3(C), the track is longitudinally divided into a plurality of areas (in FIGS. 3(A), 3(B) and 3(C), three areas 1, 2 and 3). The area selecting circuit 32 first sends an area selecting signal 34 indicative of an instruction to select the area 1 to the ATF error detecting circuit 22. According to the area selecting signal 34, the ATF error detecting circuit 22 detects the amount of tracking deviation relative to the area 1 and outputs the detected amount to the servo circuit 28. The servo circuit 28 controls the drum motor 24 and the capstan motor 26 in accordance with the output of the ATF error detecting circuit 22 so that the reproducing head 10 can trace a target track with a predetermined amount of tracking deviation (zero tracking deviation or a predetermined fixed amount of tracking deviation).

The trace A shown in FIG. 3(A) is obtained by performing tracking control so that the amount of tracking deviation relative to the area 1 can be made zero. The trace B shown in FIG. 3(B) is obtained by performing tracking control so that the amount of tracking deviation relative to the area 2 can be made zero. The trace C shown in FIG. 3(C) is obtained by performing tracking control so that the amount of tracking deviation relative to the area 3 can be made zero.

The digital demodulating circuit 12 demodulates the reproduced RF signal outputted from the reproducing head 10 into digital data. The error correcting circuit 14 detects errors in the digital data outputted from the digital demodulating circuit 12, and corrects the error within the range of correction capability. The reproduction video signal processing circuit 16 converts into a video signal the error-corrected reproduced data outputted from the error correcting circuit 14. The video signal outputted from the reproduction video signal processing circuit 16 is outputted to the outside from the output terminal 18.

Each time the error correcting circuit 14 detects error, the error correcting circuit 14 outputs an error detection signal to the amount-of-error measuring circuit 20. The amount-of-error measuring circuit 20 measures the amount of error of the reproduced and demodulated digital data over the entire track on the basis of the error detection signal outputted from the error correcting circuit 14. The amount-of-error measuring circuit 20 transmits the total amount of error to the amount-of-error comparing circuit 30 of the servo circuit 28.

In this manner, it is possible to find the amount of error occurring when tracking control corresponding to the amount of tracking deviation relative to a longitudinal arbitrary area of the track is carried out.

It is assumed here that the relationship between the three traces A, B and C shown in FIGS. 3(A), 3(B) and 3(C) is Eb<Ea<Ec, where Ea represents the amount of error for the trace A, Eb represents the amount of error for the trace B and Ec represents the amount of error for the trace C.

Figure 4:
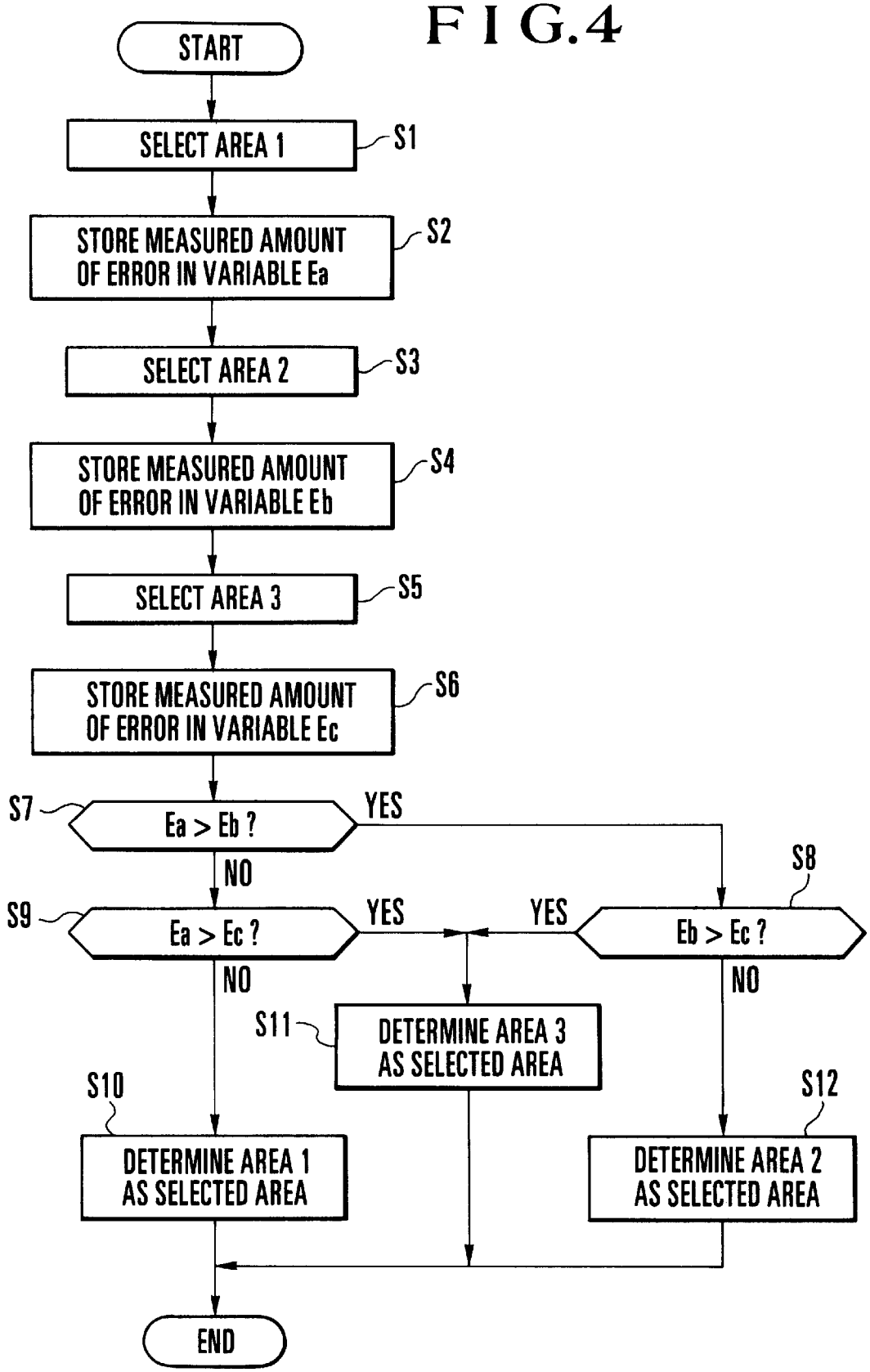
FIG. 4 is a flowchart showing the operation of the device shown in FIG. 2.

FIG. 4 is a flowchart showing an area selecting operation which is performed by the servo circuit 28, particularly, the amount-of-error comparing circuit 30 and the area selecting circuit 32 in order to realize tracking control capable of minimizing the amount of error.

First of all, the area 1 is provisionally selected, and tracking control is executed on the basis of the output of the ATF error detecting circuit 22 that is obtained at that time (S1). The amount of error measured at this time is stored in the variable Ea (S2). Then, the area 2 is selected, and tracking control is executed on the basis of the output of the ATF error detecting circuit 22 that is obtained at that time (S3). The measured amount of error is stored in the variable Eb (S4). Then, the area 3 is selected, and tracking control is executed on the basis of the output of the ATF error detecting circuit 22 that is obtained at that time (S5). The measured amount of error is stored in the variable Ec (S6).

The measured amounts of error Ea. Eb and Ec are compared with one another, and a selected area for tracking control is determined to minimize the total amount of error.

Specifically, if Ea is not greater than Eb and not greater than Ec (S7 and S9), the area 1 is determined as a selected area for tracking control (S10). If Eb is less than Ea and not greater than Ec (S7 and S8), the area 2 is determined as a selected area for tracking control (S12). In any other case, specifically, if Ea>Eb>Ec (S7 and S8) or Eb≦Ea>Ec (S7 and S9), the area 3 is determined as a selected area for tracking control (S11).

The area selecting operation of the servo circuit 28 may be executed by an arbitrary number of times, but it is preferable to execute the area selecting operation according to the flowchart shown in FIG. 4 at an instant of time such as when a reproducing operation is started, when tracing for several frames (fields) is completed, when tracing for several tracks is completed, when a recorded speed mode varies, or when an alteration of a recording environment is inferred from subsidiary information such as a recording date or time.

As is apparent from the above description, according to the first embodiment, it is possible to maintain the state of tracking control capable of achieving a relatively small amount of error with respect to various curved tracks.

A second embodiment of the present invention will be described below with reference to FIGS. 5 and 6.

Figure 5:
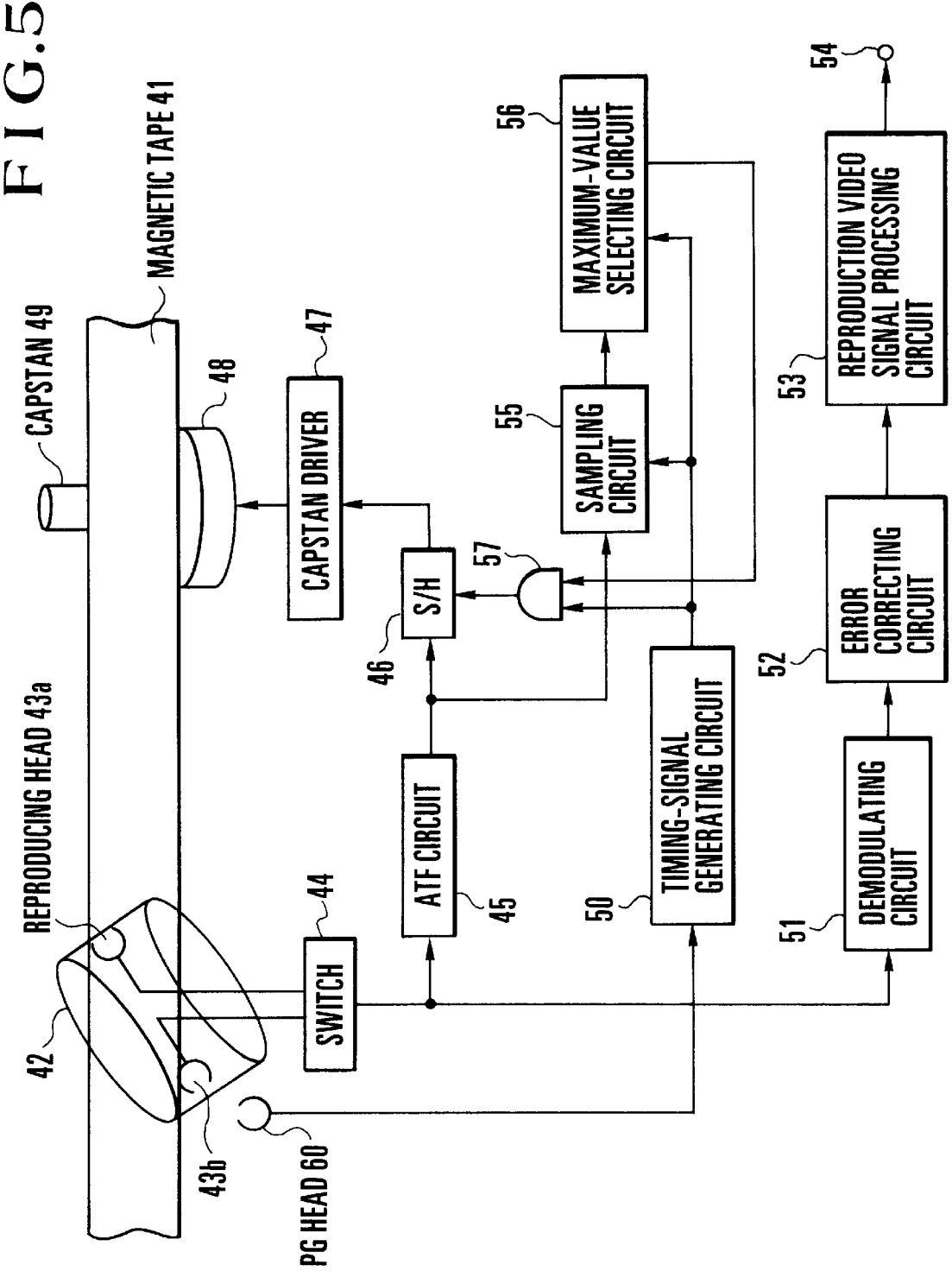
FIG. 5 is a schematic block diagram showing the arrangement of the essential elements of a digital VTR according to a second embodiment of the present invention.

Referring to FIG. 5, oblique tracks (not shown) are formed on a magnetic tape 41 in parallel with one another, and a digital video signal and a pilot signal for use in tracking control are recorded in each of the oblique tracks. The pilot signal is reproduced by reproducing heads 43a and 43b, whereby tracking control is enabled.

A switch 44 is provided for converting the reproduced outputs of the reproducing heads 43a and 43b into a continuous signal, and the output of the switch 44 is supplied to a tracking-control-signal generating circuit (ATF circuit) 45 and a demodulating circuit 51.

The demodulating circuit 51 demodulates the reproduced digital signal to obtain the original digital information signal, and inputs the original digital information signal to an error correcting circuit 52 provided at the next stage. The error correcting circuit 52 corrects the error of the original digital information signal and inputs the corrected digital information signal to a reproduction video signal processing circuit 53. The reproduction video signal processing circuit 53 performs predetermined processes which are well known in the field of digital VTRs, for example, expansion of compressed data and array conversion, and outputs the reproduced video signal to an output terminal 54.

In the meantime, the ATF circuit 45 extracts the pilot signal contained in the reproduced digital signal outputted from the switch 44, and generates a tracking error signal (ATF error signal) indicative of the amount of deviation of the reproducing head 43a or 43b from a predetermined target track, by employing a well-known technique, such as a four- or two-frequency system. This ATF error signal is sampled and held by a sample-and-hold circuit 46, and the output of the sample-and-hold circuit 46 is supplied to a capstan driver 47 as an actual control signal. The timing of executing this sample-and-hold operation is determined by an area selecting circuit which will be described later.

A PG head 60 detects the rotational phase of a rotary head drum 42, and outputs two pulses with a predetermined phase each time the rotary head drum 42 makes one rotation. These two pulses are supplied to a timing-signal generating circuit 50. The timing-signal generating circuit 50 is arranged to generate a pulse signal at the timing when the reproducing head 43a or 43b traces each of the areas 1, 2 and 3 shown in FIGS. 3(A), 3(B) and 3(C), more specifically, at the timing when the reproducing head 43a or 43b traces the center of each of the areas 1, 2 and 3 (indicated at T1, T2 and T3 in FIG. 3(A)). The timing-signal generating circuit 50 may be made up of a counter resettable by a PG pulse and a plurality of comparators each of which generates a pulse when the count value of the counter reaches a predetermined value. The timing-signal generating circuit 50 may also be incorporated in a microcomputer.

The pulse outputted from the timing-signal generating circuit 50 is supplied to a sampling circuit 55, in which ATF error signals (tracking error signals) relative to the respective areas 1, 2 and 3 are sampled. These sampled ATF error signals relative to the respective areas 1, 2 and 3 are supplied to a maximum-value selecting circuit 56 provided at the next stage. The maximum-value selecting circuit 56 detects a maximum value in accordance with the flowchart shown in FIG. 6.

Figure 6:
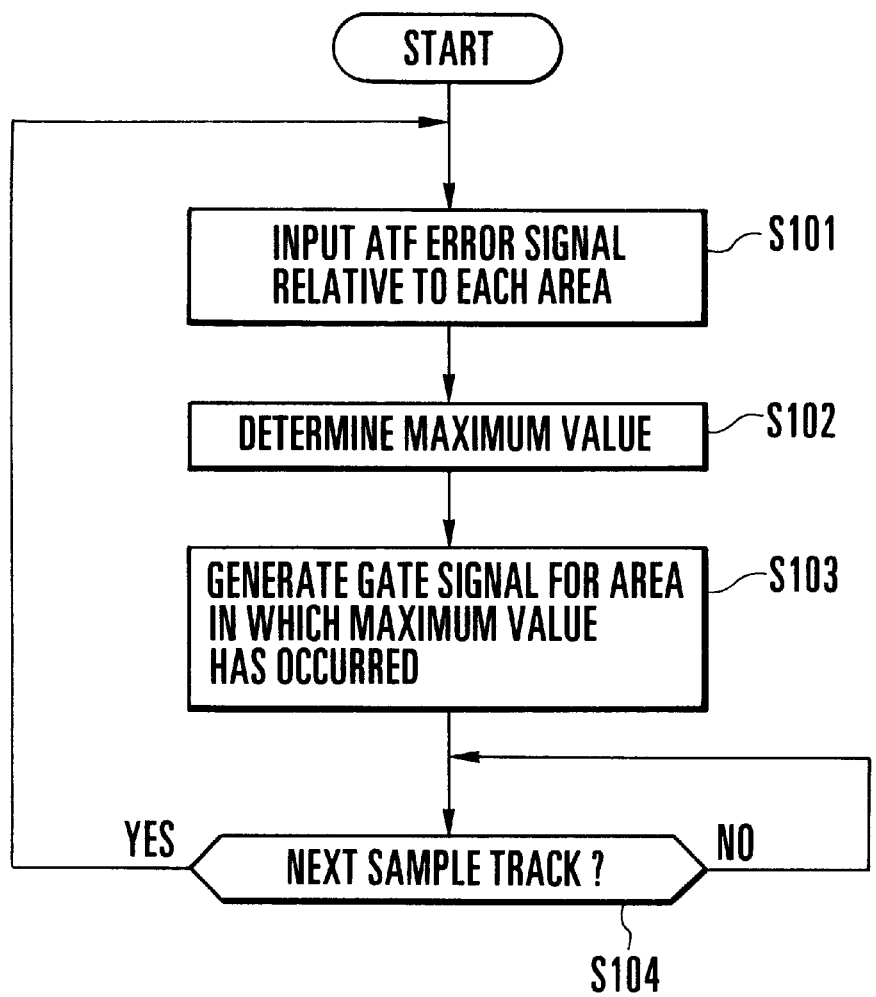
FIG. 6 is a flowchart showing the operation of the device shown in FIG. 5.

In Step S101 of FIG. 6, the ATF error signals relative to the respective areas 1, 2 and 3, i.e., the ATF error signals sampled at the aforesaid timings T1, T2 and T3, are inputted into the maximum-value selecting circuit 56, and it is determined in Step S102 which of the ATF error signals has a maximum value. Then, the maximum-value selecting circuit 56 generates a gate signal for gating a signal to be obtained during the time period that the reproducing head 43a or 43b is tracing the area in which the maximum value has occurred (S103).

In the second embodiment, the aforesaid comparison between the ATF error signals relative to the respective areas 1, 2 and 3 is made at intervals of a predetermined number of tracks. A track to be subjected to such comparison will be hereinafter referred to as "sample track". In Step S104, the flow waits for the next sample track to arrive, and each time the next sample track arrives, the above-described Steps S101 to S103 are repeated. The processing of Step S104 is realized by outputting a pulse and resetting the count value of a counter when the count value of the counter, which counts up at intervals of the period of reproduction from each track, reaches a predetermined value.

An AND gate 57 gates only a timing pulse from among the aforesaid timing pulses which occurs while the reproducing head 43a or 43b is tracing the area in which the ATF error signal having the maximum value has occurred, and conducts the timing pulse to the sample-and-hold circuit 46. The output of the sample-and-hold circuit 46 is supplied to the capstan driver 47 and serves as a final tracking signal for controlling the rotation of a capstan 49, i.e., the transport of the magnetic tape 41.

In the above-described arrangement, tracking control is performed so that the reproducing head 43a or 43b can trace in a "just-track" state the area in which the maximum-value ATF error signal has been obtained, and by setting the driven speed of the capstan 49 to an appropriate speed, control is performed so that the value of the maximum-value ATF error signal can be minimized, i.e., tracking control is performed so that the trace locus of the reproducing head 43a or 43b can be located in the middle of an area from which the trace locus has deviated most greatly. For example, tracking control is performed so that the tracking error signal relative to the area 1 and the tracking error signal relative to the area 2 can be made equal to each other, as shown in FIG. 3(B).

According to each of the present embodiments arranged in the above-described manner, it is possible to realize tracking control so that the error rate can be prevented from becoming substantially large with respect to any of the areas. Accordingly, the quality of reproduced digital signals is improved. In other words, the error rate of data after error correction is extremely small, and if the second embodiment is applied to digital VTRS, the quality of reproduced images is improved.

Although each of the present embodiments has been described with reference to the example in which the present invention is applied to a digital VTR, the present invention can be applied to other kinds of digital data recording apparatus. The kind of recording medium is not limited to magnetic tape, and the present invention can be applied to an apparatus of the type which employs another recording medium which requires tracking control.

As is apparent from the foregoing description, according to the present invention, it is possible to realize tracking control capable of improving the quality of a digital reproduced signal as a whole.

What is claimed is:

1. A reproducing device comprising:

reproducing means for reproducing digital information from a plurality of tracks formed on a recording medium;

forming means for forming a plurality of tracking error signals which respectively indicate positional deviations of said reproducing means from separate areas in each of the tracks;

selecting means for selecting one tracking error signal corresponding to a target area for tracking in each of the plurality of tracks from among the plurality of tracking error signals in accordance with respective values of the plurality of tracking error signals; and tracking control means for controlling a relative position between said reproducing means and the recording medium, said tracking control means controlling the relative position by using the one tracking error signal selected by said selecting means without using the remaining tracking error signals in a period during which said reproducing means reproduces the digital information from one of the tracks.

2. A device according to claim 1, wherein said selecting means detects a maximum value of the plurality of tracking error signals and selects a tracking error signal having the detected maximum value.

3. A device according to claim 1, wherein said reproducing means includes a rotary head, and said forming means includes:

means for forming a tracking signal continuously indicative of positional deviations of said rotary head from the plurality of tracks;

means for generating a pulse signal synchronized with rotation of said rotary head; and means for sampling the tracking signal in accordance with the pulse signal and forming the plurality of tracking error signals.

4. A device according to claim 3, wherein said selecting means includes gate means for gating the pulse signal and means for sampling and holding the tracking signal in accordance with an output of said gate means.

5. A device according to claim 1, wherein said forming means forms the plurality of tracking error signals by using the same processing scheme.

6. A reproducing method comprising the steps of:

reproducing by reproducing means digital information from a plurality of tracks formed on a recording medium;

forming a plurality of tracking error signals which are respectively indicative of tracking errors of said reproducing step with respect to separate areas in each of the tracks;

selecting by selecting means one tracking error signal corresponding to a target area for tracking in each of the plurality of tracks from among the plurality of tracking error signals in accordance with respective values of the plurality of tracking error signals; and controlling tracking of said reproducing step with respect to the recording medium, the tracking being controlled by using the one tracking error signal selected by said selecting means without using the remaining tracking error signals in a period during which said reproducing means reproduces the digital information from one of the tracks.

7. A method according to claim 6, wherein said selecting step detects a maximum value of the plurality of tracking error signals and selects a tracking error signal having the detected maximum value.

8. A method according to claim 6, wherein the plurality of tracking error signals is formed by using the same processing scheme.

9. A reproducing apparatus, comprising:

reproducing means for reproducing digital data from a plurality of tracks formed on a recording medium;

forming means for forming a plurality of tracking error signals which respectively indicate positional deviations of said reproducing means from separate areas in each of the tracks;

tracking control means for controlling a relative position between said reproducing means and the recording medium; and determining means for determining a target area for the tracking control by said tracking control means from among the separate areas of each of the plurality of tracks according to the plurality of tracking error signals obtained by said forming means, said tracking control means controlling the relative position by using one tracking error signal which indicateds positional deviations of said reproducing means from the target area determined by said determining means without using the remaining tracking error signals in a period during which said reproducing means reproduces the digital data from one of the tracks.

* * * * *

UNITED STATES PATENT AND TRADEMARK OFFICE
CERTIFICATE OF CORRECTION

PATENT NO. : 6,028,732
DATED : February 22, 2000
INVENTOR(S) : Shuya Tanaka

It is certified that error appears in the above-identified patent and that said Letters Patent are hereby corrected as shown below:

Col. 5, line 6, delete "Eb$\leq$" and insert --Eb$\geq$--.
Col. 7, line 5, delete "VTRS" and insert --VTRs--.

Signed and Sealed this

Seventeenth Day of April, 2001

Attest:

NICHOLAS P. GODICI

Attesting Officer   Acting Director of the United States Patent and Trademark Office